United States Patent
Deroo et al.

(10) Patent No.: US 8,357,724 B2
(45) Date of Patent: Jan. 22, 2013

(54) METHOD FOR CONTROLLING THE STABILITY OR THE DROPLETS SIZE OF SIMPLE WATER-IN-OIL EMULSIONS, AND STABILIZED SIMPLE WATER-IN-OIL EMULSIONS

(75) Inventors: Sophie Deroo, L'Hay les Roses (FR); Mikel Morvan, Princeton, NJ (US)

(73) Assignee: Rhodia Chimie, Boulogne Billancourt Cedex (FR)

( * ) Notice: Subject to any disclaimer, the term of this patent is extended or adjusted under 35 U.S.C. 154(b) by 450 days.

(21) Appl. No.: 11/435,041

(22) Filed: May 16, 2006

(65) Prior Publication Data

US 2006/0205827 A1    Sep. 14, 2006

Related U.S. Application Data

(62) Division of application No. 10/364,199, filed on Feb. 11, 2003, now abandoned.

(60) Provisional application No. 60/436,939, filed on Dec. 30, 2002, provisional application No. 60/356,066, filed on Feb. 11, 2002.

(51) Int. Cl.
    *B01F 3/08* (2006.01)
(52) U.S. Cl. ............... 516/21; 516/23; 516/24; 516/25; 516/27; 516/28; 149/46; 149/60
(58) Field of Classification Search .............. 516/21, 516/23, 24, 25, 27, 28; 149/46, 60
See application file for complete search history.

(56) References Cited

U.S. PATENT DOCUMENTS

| | | | | |
|---|---|---|---|---|
| 3,447,978 A * | 6/1969 | Bluhm | ............................... | 149/2 |
| 4,032,628 A * | 6/1977 | Papantoniou et al. | ........... | 424/63 |
| 4,339,371 A * | 7/1982 | Robinson et al. | ............. | 524/310 |
| 4,357,184 A * | 11/1982 | Binet et al. | ........................ | 149/2 |
| 4,448,619 A * | 5/1984 | Mitchell | .......................... | 149/21 |
| 4,470,855 A * | 9/1984 | Bampfield | ......................... | 149/2 |
| 4,473,418 A * | 9/1984 | Bampfield et al. | ................ | 149/2 |
| 4,722,757 A * | 2/1988 | Cooper et al. | ..................... | 149/2 |
| 4,908,155 A | 3/1990 | Leemans et al. | | |
| 4,931,110 A * | 6/1990 | McKenzie et al. | ................ | 149/2 |
| 5,045,441 A | 9/1991 | Takamuki et al. | | |
| 5,304,334 A * | 4/1994 | Lahanas et al. | ................. | 516/23 |
| 5,575,988 A | 11/1996 | Knowles et al. | ................ | 424/59 |
| 6,410,005 B1 * | 6/2002 | Galleguillos et al. | ....... | 424/70.16 |
| 6,472,136 B2 | 10/2002 | Tan et al. | | |
| 6,514,361 B1 * | 2/2003 | Borden | ...................... | 149/109.6 |
| 6,564,809 B1 | 5/2003 | Resler | ........................... | 132/200 |
| 6,825,290 B2 * | 11/2004 | Adam et al. | .................... | 526/75 |
| 7,030,203 B2 * | 4/2006 | Mosbey et al. | ........... | 526/318.44 |
| 7,041,630 B1 | 5/2006 | Trinh et al. | | |
| 2003/0223948 A1 * | 12/2003 | Maubru | ..................... | 424/70.13 |
| 2008/0268004 A1 * | 10/2008 | Kim et al. | ..................... | 424/401 |
| 2011/0040025 A1 * | 2/2011 | Deroo et al. | .................. | 524/548 |

OTHER PUBLICATIONS

Wikipedia definition HLB, 2008.*
Concise Chemical and Technical Dictionary; Chemical Publishing Co., Inc.; Edited by H. Bennett, F.A.I.C.; B. R. Laboratory.
Harrap Dictionary; ISBN 0-245-51860-6; Harrap Limited 1939; 1980; Reprinted: 1988.
Johnson et al; Acrylic Latex Paints: *Still the Gold Standard for Exterior Performance*; Plastics Technology; Posted on: Sep. 1, 2004; http://www.pcimag.com/CDA/ArticleInformation/coverstory/BNPCoverStoryItem/0.1 . . . ; Jun. 20, 2005.

* cited by examiner

*Primary Examiner* — Margaret Moore
(74) *Attorney, Agent, or Firm* — Hunton & Williams, LLP

(57) ABSTRACT

The invention concerns a process for controlling the stability or the droplets sized of simple water-in-oil emulsions, wherein a di-block or tri-block copolymer is used. A block is a hydrophilic block, the other block is a hydrophobic block. The invention concerns also a stabilized water-in-oil emulsion.

42 Claims, No Drawings

METHOD FOR CONTROLLING THE STABILITY OR THE DROPLETS SIZE OF SIMPLE WATER-IN-OIL EMULSIONS, AND STABILIZED SIMPLE WATER-IN-OIL EMULSIONS

CROSS REFERENCES TO RELATED APPLICATIONS

This application is a division of U.S. application Ser. No. 10/364,199, filed on Feb. 11, 2003, now abandoned, which claims priority to Provisional Application No. 60/436,939, filed Dec. 30, 2002, and to Provisional Application No. 60/356,066, filed Feb. 11, 2002. The entire contents of Provisional Application No. 60/436,939 and Provisional Application No. 60/356,066 is incorporated herein by reference.

BACKGROUND OF THEN INVENTION

The invention relates to a method for controlling the stability of simple water-in-oil emulsions, and to stabilize simple water-in-oil emulsions.

Emulsions are compositions, usually liquid or gelled, comprising at least two phases which are not miscible, one phase being dispersed in the form of droplets into the other. Using emulsifiers allows obtaining the dispersion of one of the phases in the other. Thus, emulsions are usually obtained by mixing the phases and emulsifiers with adding energy, for examples by vigorously mixing and/or heating. The nature and the amount of the emulsifier, and the nature and the amount of each phase are parameters in emulsions art. These parameters usually have an influence on the droplets size, the quantity of droplets emulsified, the stability, the energy to be added for emulsifying.

Direct emulsions, essentially consisting of a hydrophobic phase dispersed in an aqueous phase, and water-in-oil emulsions, essentially consisting of an aqueous phase dispersed in a hydrophobic phase, are known. These two types of emulsions are usually considered as two different technical fields, since different phases are usually used, as well as different emulsifiers (nature and amounts). Simple emulsions and multiple emulsions are also known. Multiple emulsions consist for example of three phases system wherein an internal emulsion comprising a first phase dispersed in a second phase is dispersed as droplets in a third external phase. In such emulsions the first and the third phase may be the same, being separated by the second phase. Simple emulsions consist of an internal phase being dispersed in an external phase, wherein the internal phase does not further comprises a liquid phase dispersed therein. Simple and multiples emulsions are also considered as different art, since problems to be addressed are different. The invention relates to simple water-in-oil emulsions.

Controlling the droplets size and the stability of emulsions (i.e. avoiding demixion coalescence, flocculation and/or creaming) is an issue to be addressed for many purposes. In consumer goods, there is a need for emulsions to have a long lifetime, as well for it to keep its properties as for it to keep a good aspect. Examples of consumer goods comprising simple water-in-oil emulsions are cosmetics compositions such as make-up, and skin-care creams, for example sunscreens, and more particularly waterproof sunscreens . . . Simple water-in-oil emulsions are also used in the field of explosive products. Stability a particularly important property in that field. Other fields wherein simple water-in-oil emulsions are used include some anti-foaming compositions used in paper industry; water-in-oil emulsion polymerization, fracturing fluids used in oil fields, vehicles diesel gas (green diesel).

There is a need for new emulsifiers or emulsifier mixtures, that would provide an emulsification (droplets size) and/or a stability as good as and/or better than those of current emulsifiers or emulsifier mixtures, for some different phases or at different conditions, for example at higher temperatures.

BRIEF SUMMARY OF THE INVENTION

The invention relates to a method for controlling the stability or the droplets size of a simple water-in-oil emulsion comprising droplets of an aqueous phase dispersed in a hydrophobic phase,
said method comprising the step of using in the emulsion:
  a block copolymer selected from the group consisting of:
    (block A)-(block B) di-block copolymers,
    (block A)-(block B)-(block A) tri-block copolymers, and
    (block B)-(block A)-(block B) tri-block copolymers,
  wherein
    block A is a hydrophilic block,
    block B is a hydrophobic block, and
    block A or block B comprises units deriving from mono-alpha-ethylenically-unsaturated monomers, and
  optionally, an emulsifier, different from the block copolymer.

By controlling the droplets size of an emulsion, it is meant that it is possible to obtain an emulsion. The use of the block copolymer, alone or in a mixture with a further emulsifier, allows emulsifying. It is indeed an emulsifier.

By controlling the stability of an emulsion, it is meant that:
the emulsion remains stable longer with the block copolymer than without the block copolymer, for the same amount of surfactant in the emulsion, and/or
the emulsion with the block copolymer remains stable as long as, or longer than, an emulsion without the block copolymer and comprising at least the same amount of surfactant than the amount of surfactant together with block copolymer, and/or
the emulsion with the block copolymer remains stable longer and/or at a higher temperature than with another emulsifying system such as another polymer and/or surfactant that does not comprise the block copolymer, and that comprise at least the same amount of surfactant and/or other polymer than the amount of surfactant together with block copolymer.

Whereas increasing the stability of an emulsion without adding some more emulsifier (surfactant, polymer) is useful, lowering the amount of emulsifier (surfactant, polymer) without decreasing the stability is also useful, as it is for example cost-effective and environment friendly.

The invention is an alternative solution to the use of known emulsifiers or emulsifying systems, that provides at least the same properties, and to many extends advantages. These advantages include a better stability at high temperature, and/or a better stability for some hydrophobic phases (nature and/or amount).

By using a block copolymer in an emulsion, it is meant that the block copolymer is a compound comprised in the emulsion. It may for example have been added to an emulsion, to the compounds comprised in the emulsion, optionally pre-mixed with some of them, prior to emulsifying, or to a dried emulsion or water, prior to mixing said dried emulsion with water to recover an emulsion.

Emulsions may be prepared in a conventional way, mixing the aqueous phase and the hydrophobic phase, the surfactant, and the block copolymer, providing some energy for emulsifying. Emulsions may be for example prepared with a homogenizer.

In a further aspect, the invention relates to a simple water-in-oil emulsion comprising:
- droplets of an aqueous phase dispersed in a hydrophobic phase,
- a block copolymer selected from the group consisting of:
  - (block A)-(block B) di-block copolymers,
  - (block A)-(block B)-(block A) tri-block copolymers, and
  - (block B)-(block A)-(block B) tri-block copolymers,
  wherein
  - block A is a hydrophilic block,
  - block B is a hydrophobic block, and
  - block A or block B comprises units deriving from mono-alpha-ethylenically-unsaturated monomers, and
- optionally, an emulsifier, different from the block copolymer.

DETAILED DESCRIPTION OF THE INVENTION

Definitions

In the present specification, the molecular weight of a polymer, a copolymer, a moiety, a graft, a side-chain, a core, a branch, a block or a backbone refers to the weight-average molecular weight of said polymer, copolymer, moiety, graft, side-chain, core, branch, block or backbone. The weight-average molecular weight of the polymer or copolymer can be measured by gel permeation chromatography (GPC). In the present specification, the molecular weight of a graft, side-chain, core, branch, block or backbone refers to the molecular weight calculated from the amounts of monomers, polymers, initiators and/or transfer agents used to make the said graft, side-chain, core, branch, block or backbone. The one skilled in the art knows how to calculate these molecular weights. The ratios by weight between blocks refers to the ratios between the amounts of the compounds used to make said moieties, considering an extensive polymerization.

Typically, the molecular weight M of a block, graft, side-chain, branch, core or backbone is calculated according to the following formula:

$$M = \sum_i M_i^* \frac{n_i}{n_{precursor}},$$

wherein $M_i$ is the molecular weight of a monomer i, $n_i$ is the number of moles of a monomer i, and $n_{precusor}$ is the number of moles of a compound the macromolecular chain of the block, graft, side-chain, branch, core or backbone will be linked to. Said compound may be a transfer agent or a transfer group, a previous block, or a graft or reactive side-chain. If it is a previous block, the number of moles may be considered as the number of moles of a compound the macromolecular chain of said previous block has been linked to, for example a transfer agent or a transfer group. It may be also obtained by a calculation from a measured value of the molecular weight of said previous block. If two blocks are simultaneously grown from a previous block, at both ends, the molecular weight calculated according to the above formula should be divided by two.

In the present specification, a unit deriving from a monomer is understood as a unit that may be directly obtained from the said monomer by polymerizing. Thus, a unit deriving from an ester of acrylic or methacrylic acid does not encompass a unit of formula —CH—CH(COOH)—, —CH—C(CH$_3$)(COOH)—, —CH—CH(OH)—, —CH—C(CH$_3$)(OH)—, obtained for example by polymerizing an ester of acrylic or methacrylic acid, or a vinyl acetate, and then hydrolyzing. A unit deriving from acrylic acid or methacrylic acid encompasses for example a unit obtained by polymerizing a monomer (for example an alkyl acrylate or methacylate) and then reacting (for example hydrolyzing) to obtain units of formula —CH—CH(COOH)— or —CH-C(CH$_3$)(COOH)—. A unit deriving from vinyl alcohol encompasses for example a unit obtained by polymerizing a monomer (for example a vinyl ester) and then reacting (for example hydrolyzing) to obtain units of formula —CH—CH(OH)— or —CH—C(CH$_3$)(OH)—.

Aqueous Phase

The aqueous phase is based on water, and may comprise some further ingredients, such as active agents.

In a particular embodiment, the hydrophilic phase is a hydrophilic phase of an explosive emulsion. Such a phase comprises water, an oxygen-donating compound and optionally other water-soluble additives. Examples of oxygen-donating compounds include ammonium nitrate. In such a hydrophilic phase, the water content usually varies in the range 2-30 weight %, preferably in the range 2-30 weight %.

Active agents that may be comprised in aqueous phase include organic or inorganic compounds, as long as they are water-soluble or water-dispersible. They may be solubilized in a hydrophilic solvent that is miscible with water, such as methanol, ethanol, propylene glycol, glycerol. Actives may also be in a solid form, dispersed in the aqueous phase.

Examples of actives in an aqueous phase, that may be used in cosmetics, include compounds having a cosmetic effect, a therapeutic effect, and compounds used for treating hair or skin.

Thus, active agents that may be used include hair and skin conditioning agents, such as polymers comprising quaternary ammonium groups, optionally comprised in heterocycles (quaternium or polyquaternium type compounds), moisturizing agents, fixing (styling) agents, more preferably fixing polymers such as homo-, co-, or terpolymers, for example acrylamide, acrylamide/sodium acrylate, sulfonated polystyrene, cationic polymers, polyvinylpyrrolidone, polyvinyl acetate . . .

Actives that may be comprised in the aqueous phase also include coloring agents, astringents, that may be used in deodorizing compoisitions, such as aluminum salts, zirconium salts, antibacterial agents, anti-inflammatory agents, anesthetizing agents, solar filter agents such as TiO$_2$, or preferably nanometric TiO$_2$, optionally coated.

Actives comprised in the aqueous phase, that may be used in cosmetics, include α- and β-hydroxyacids, such as citric-acid, lactic acid, glycolic acid, salicylic acid, cicarboxylic acids, preferably unsaturated ones comprising from 9 to 16 carbon atoms, such as azelaic acid, C vitamin and derivatives thereof, particularly phosphate-based or glycosyl-based derivatives, biocidal agents, such as preferably cationic ones (for example Glokill PQ, Rhodoaquat RP50, marketed by Rhodia).

Examples of actives comprised in the aqueous phase, that may be used in food industry, include divalent calcium salts (phosphates, chlorides . . . ), that may be used for cross-linking texturing polymers such as alginates, carraghenans. Sodium bicarbonate may also be used.

Examples of actives comprised in the aqueous phase, that may be used in agrochemicals, include hydrophilic pesticides and pesticides hydrophilic nutritive ingredients.

Examples of actives comprised in aqueous phase, that may be used in oil field, include hydrophilic compounds useful for cementing, drilling, or stimulating oil wells (for example par fracturing). Examples include cross-linking catalysts such as lithium salts, chlorides, acetate. Examples also include compounds that degrade polysaccharides, such as carboxylic acids (for example citric acid), enzymes, and oxidizing agents.

Examples of actives comprised the aqueous phase, that may be used in paper industry, include calcium chloride, and hydrochloric acid.

The aqueous phase may also comprise monomers, for example cationic monomers, to be reacted with monomers or polymers comprised in the hydrophobic phase.

Hydrophobic Phase

The hydrophobic phase is not miscible with the aqueous phase. It is often referred to an oily phase. By "not miscible", it is meant that the ingredient or mixture of ingredients of the hydrophobic phase is not more than 10 weight % soluble in water, at a temperature comprised between 20° C. and the emulsion-preparation temperature or emulsion-use temperature.

Suitable hydrophobic phases include:
organic oils, vegetal oils, mineral oils, waxes, for example used in the field of cosmetics,
saturated or unsaturated fatty acids, saturated or unsaturated fatty acid esters, saturated or unsaturated fatty alcohols,
industrial lubricants or greases, for examples used to lubricate metal, to work metal, or recovered from metal degreasing,
silicone oils,
essential oils, and
agrochemical compounds.

In a particular embodiment, the hydrophobic phase a hydrophobic phase of an explosive emulsion. Examples of such a phase include mineral oils, in particular paraffin mineral oils, naphtalene-based oils, vegetable oils, used oils or diesel oils.

The hydrophobic phase may comprise some further ingredients, such as active agents.

Examples of actives comprised the hydrophobic phase, that may be used in food industry, include actives used in food industry include mono-, di- and triglycerides, essential oils, aromas, and food compatible coloring agents.

Examples of actives comprised the hydrophobic phase, that may be used in cosmetics, include, fragrances, perfumes, silicone oils, such as dimethicones, lipophilic vitamins such as A vitamin.

Examples of actives comprised the hydrophobic phase, that may be used in paints, include, alkydes resins, epoxy resins, (poly)isocyanates masked or not masked.

Examples of actives comprised the hydrophobic phase, that may be used in paper industry include alkylcetene dimer (AKD), and alkenyl succinic anhydride (ASA).

Examples of actives comprised the hydrophobic phase, that may be used in agrochemicals, include α-cyano-phenoxybenzyl carboxylates, α-cyano-halogenophenoxy-carboxylates, N-methylcarbonates comprising aromatic groups, Aldrin, Azinphos-methyl, Benfluralin, Bifenthrin, Chlorphoxim, Chlorpyrifos, Fluchloralin, Fluroxypyr, Dichlorvos, Malathion, Molinate, Parathion, Permethrin, Profenofos, Propiconazole, Prothiofos, Pyrifenox, Butachlor, Metolachlor, Chlorimephos, Diazinon, Fluazifop-P-butyl, Heptopargil, Mecarbam, Propargite, Prosulfocarb, Bromophos-ethyl, Carbophenothion, and Cyhalothrin.

Examples of actives comprised the hydrophobic phase, that may be used in detergency compositions, include silicone antifoaming agents, fragrances and perfumes.

Examples of actives comprised the hydrophobic phase also include organic solvents or mixtures thereof, such as solvent used for cleaning or stripping such as aromatic oil cuts, terpenic compounds such as D- or L-limonenes, and solvents such as Solvesso®. Solvents also include aliphatic esters such as methyl esters of a mixture of acetic acid, succinic acid, glutaric acid (mixture of Nylon monomer preparation by-products), and chlorinated solvents.

Optional Emulsifier

The emulsion optionally comprises an emulsifier different from the block copolymer. The emulsifier may be a surfactant or a polymer. It is mentioned the emulsion may comprise no optional emulsifier, less than 4% by weight (based on the total weight of the emulsion), or more than (or equal to) 4% by weight. As the block copolymer has also emulsifying properties, the emulsifier different from the block copolymer may also be referred to as a co-emulsifier. A large variety of emulsifiers or mixture of emulsifiers may be used. That usually depends on the phases and on what the emulsion is used for.

In a preferred embodiment, the mixture of the block copolymer and the emulsifier different from the block copolymer has a HLB of lower than or equal to 10. As the block copolymer usually has a HLB of lower than 10, the emulsifier may have a HLB of higher than 10, or of lower than or equal to 10. Using the block copolymer is thus a way of tuning the HLB of emulsifiers, for example of lowering their HLB. Using the block copolymer in combination with an emulsifier different from the block copolymer may allow the use of said emulsifier in emulsifying or stabilizing emulsions wherein such a result would not have been obtained with said emulsifier alone.

Preferred surfactants, as emulsifiers different from the block copolymer, have a HLB of lower than or equal to 10, and may be selected from the group consisting of sorbitan esters, ethoxylated alcohols, ethoxylated alkyl phenols, and ethoxylated castor oils. Examples of such surfactants include:
sorbitan trioleate,
sorbitan tristearate,
polyoxyethylene sorbitol hexastearate,
lactylated mono- and diglycerides of fat-forming fatty acids,
ethylene glycol fatty acid ester,
mono- and diglycerides of fat-forming fatty acids,
mono- and di glycerides from the glycerolysis of edible fats,
propylene glycol fatty acid ester,
propylene glycol monostearate,
ethylene glycol fatty acid ester,
sorbitan sesquioleate,
polyoxyethylene sorbitol 4.5 oleate,
glycerol monostearate,
sorbitan partial fatty esters,
high-molecular-weight fatty amine blend,
diethylene glycol fatty acid ester
polyoxyethylene stearyl ether,
polyoxyethylene oleyl ether,
polyoxyethylene sorbitol beeswax dervative,
polyoxyethylene cetyl ether,
diethylene glycol monolaurate,
sorbitan monopalmitate,
sorbitan monooleate polyoxyethylene ester mixed fatty and resin acids blend,
polyoxypropylene mannitol dioleate,
polyoxyethylene sorbitol lanolin derivative,
sorbitan monolaurate,
sorbitan monooleate, polyoxyethylene sorbitol esters of mixed fatty and resin acids,
polyoxyethylene fatty acid,
polyoxyethylene sorbitol oleate,
polyoxyehtylene sorbitan monostearate,
polyoxyethylene sorbitol tallow esters,
polyoxyethylene sorbitol tall oil,
polyoxyethylene lauryl ether,
polyoxyethylene sorbitan monooleate.

A series of emulsifiers include polymers sold under the trademarks "Hypermer" or "Arlacel" by ICI, and described in U.S. Pat. Nos. 4,504,276, 4,509,950, 4,776,966. Examples of interesting emulsifiers include block or graft copolymers of formula $(A\text{-}COO)_m B$, wherein m is of at least 2, A is a polymeric component having a molecular weight of at least 500 and is the residue of an oil-soluble complex mono-carboxylic acid of formula (I):

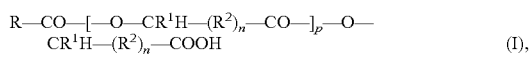

$$R\text{—}CO\text{—}[\text{—}O\text{—}CR^1H\text{—}(R^2)_n\text{—}CO\text{—}]_p\text{—}O\text{—}CR^1H\text{—}(R^2)_n\text{—}COOH \quad (I),$$

wherein R is hydrogen or a monovalent or substituted hydrogen group, $R^1$ is hydrogen or a monovalent $C_1$ to $C_{24}$ hydrocarbon group, $R^2$ is a divalent C, to $C_{24}$ hydrocarbon group, n is 0 or 1, and p is 0 or an integer of up to 200, and B is a polymeric component having a molecular weight of at least 500 and, in the case where m is 2, is a divalent residue of a water-soluble polyalkylene glycol of the following formula (II):

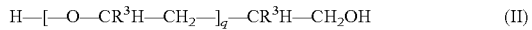

$$H\text{—}[\text{—}O\text{—}CR^3H\text{—}CH_2\text{—}]_q\text{—}CR^3H\text{—}CH_2OH \quad (II)$$

wherein $R^3$ is hydrogen or a C, to $C_3$ alkyl group, q is of from 10 to 500, or, in the case where m is greater than 2, is the residue of valency m of a water soluble polyether polyol of the following formula (III):

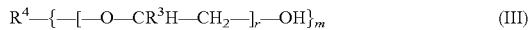

$$R^4\text{—}\{\text{—}[\text{—}O\text{—}CR^3H\text{—}CH_2\text{—}]_r\text{—}OH\}_m \quad (III)$$

wherein $R^3$ and m have their previous significance, r is of from 0 to 500, provided that de total number of $\text{—}O\text{—}CR^3H\text{—}CH_2\text{—}$ units in the molecule is at least 10, and $R^4$ is the residue of an organic compound containing in the molecule m hydrogen atoms reactive with an alkylene oxide.

Additional emulsifiers include optionally modified polyak(en)yl succinic anhydrides, such as polyisobutene succinic anhydrides. These emulsifiers include for example the reaction product of a polyak(en)yl succinic anhydride with a polar compound comprising in the molecule at least one hydroxyl or amino group. The preferred polyak(en)yl succinic anhydride are poly (isobutenyl) succinic anhydrides having a molecular weight in the range 400 to 5000. The preferred polar compound with which the anhydride is reacted may be a polyol such as ethylene glycol, propylene glycol, glycerol, trimethylol propane, pentaerythritol or sobitol; or with a polyamine, for example ethylene diamine, trimethylene diamine, hexamethylene diamine, dimethylaminopropylamine or diethylaminopropylamine or with a hydroxyamine for example monoethanolamine, diethanolamine, dipropanoamine; tris(hydroxymathyl)aminomethane or dimethylaminoethanol.

Block Copolymer

The block copolymer comprises at least two different blocks, block A, and block B. It is selected from the group consisting of (block A)-(block B) di-block copolymers, (block A)-(block B)-(block A) tri-block copolymers, and (block B)-(block A)-(block B) tri-block copolymers. The block copolymer is a linear block copolymer. By linear it is meant that the blocks arrangement is linear. However, a block may be a block having a comb polymer structure, that is comprising repetitive units comprising a polymeric moiety (macromonomers).

A block is usually defined by repeating units it comprises. A block may be defined by naming a polymer, or by naming monomers it is derived from. In the present specification, a unit deriving from a monomer is understood as a unit that may be directly obtained from the said monomer by polymerizing. Thus, a unit deriving from an ester of acrylic or methacrylic acid does not encompass a unit of formula $\text{—}CH\text{—}CH(COOH)\text{—}$, $\text{—}CH\text{—}C(CH_3)(COOH)\text{—}$, $\text{—}CH\text{—}CH(OH)\text{—}$, $\text{—}CH\text{—}C(CH_3)(OH)\text{—}$, obtained for example by polymerizing an ester of acrylic or methacrylic acid, or a vinyl acetate, and then hydrolyzing. A unit deriving from acrylic acid or methacrylic acid encompasses for example a unit obtained by polymerizing a monomer (for example an alkyl acrylate or methacylate) and then reacting (for example hydrolyzing) to obtain units of formula $\text{—}CH\text{—}CH(COOH)\text{—}$ or $\text{—}CH\text{—}C(CH_3)(COOH)\text{—}$. A unit deriving from vinyl alcohol encompasses for example a unit obtained by polymerizing a monomer (for example a vinyl ester) and then reacting (for example hydrolyzing) to obtain units of formula $\text{—}CH\text{—}CH(OH)\text{—}$ or $\text{—}CH\text{—}C(CH_3)(OH)\text{—}$.

A block may be a copolymer, comprising several kind of repeating units, deriving form several monomers. Hence, block A and block B are different polymers, deriving from different monomers, but they may comprise some common repeating units (copolymers). Block A and Block B preferably do not comprise more than 50% of a common repeating unit (derived from the same monomer).

Block A is hydrophilic and block B is hydrophobic. Hydrophilic or Hydrophobic properties of a block refer to the property said block would have without the other block(s), that is the property of a polymer consisting of the same repeating units than said block, having the same molecular weight. By hydrophilic block, polymer or copolymer, it is meant that the block, polymer or copolymer does not phase separate macroscopically in water at a concentration from 0,01% and 10% by weight, at a temperature from 20° C. to 30° C. By hydrophobic block, polymer or copolymer, it is meant that the block, polymer or copolymer does phase separate macroscopically in the same conditions.

It is further mentioned that the block copolymer may be soluble in water, ethanol, and/or in a hydrophobic compound. In a preferred embodiment, the block copolymer is soluble in water, ethanol or in a mixture of water and ethanol. The block copolymer may be introduced in the emulsion, or in the mixture of the compounds comprised in the emulsion, in a solid form, or in a solution form.

Preferably, block B comprises repeating units deriving from monomers selected from the group consisting of:
dialkylsiloxane, such as dimethyl siloxane,
alkylesters of an alpha-ethylenically-unsaturated, preferably mono-alpha-ethylenically-unsaturated, monocarboxylic acid, such as methylacrylate, ethylacrylate, n-propylacrylate, n-butylacrylate, methylmethacrylate, ethylmethacrylate, n-propylmethacrylate, n-butylmethacrylate, and 2-ethyl-hexyl acrylate, 2-ethyl-hexyl methacrylate, isooctyl acrylate, isooctyl methacrylate, lauryl acrylate, lauryl methacrylate,
vinyl Versatate,
acrylonitrile,
vinyl nitriles, comprising from 3 to 12 carbon atoms,
vinylamine amides, and
vinylaromatic compounds such as styrene.

Preferably, block A comprises repeating units deriving from monomers selected from the group consisting of:

ethylene oxide,
vinyl alcohol,
vinyl pyrrolidone,
acrylamide, methacrylamide,
polyethylene oxide (meth)acrylate (i.e. polyethoxylated (meth)acrylic acid),
hydroxyalkylesters of alpha-ethylenically-unsaturated, preferably mono-alpha-ethylenically-unsaturated, monocarboxylic acids, such as 2-hydroxyethylacrylate, and
hydroxyalkylamides of alpha-ethylenically-unsaturated, preferably mono-alpha-ethylenically-unsaturated, monocarboxylic acids,
dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
ethylenimine, vinylamine, 2-vinylpyridine, 4-vinylpyridine;
trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride,
diallyidimethyl ammonium chloride,
monomers having the following formula:

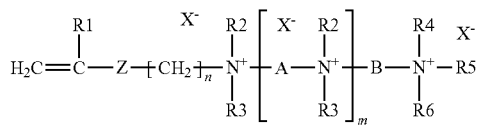

wherein
$R_1$ is a hydrogen atom or a methyl or ethyl group;
$R_2$, $R_3$, $R_4$, $R_5$ and $R_6$, which are identical or different, are linear or branched $C_1$-$C_6$, preferably $C_1$-$C_4$, alkyl, hydroxyalkyl or aminoalkyl groups;
m is an integer from 1 to 10, for example 1;
n is an integer from 1 to 6, preferably 2 to 4;
Z represents a —C(O)O— or —C(O)NH— group or an oxygen atom;
A represents a $(CH_2)_p$ group, p being an integer from 1 to 6, preferably from 2 to 4;
B represents a linear or branched $C_2$-$C_{12}$, advantageously $C_3$-$C_6$, polymethylene chain optionally interrupted by one or more heteroatoms or heterogroups, in particular O or NH, and optionally substituted by one or more hydroxyl or amino groups, preferably hydroxyl groups;
X, which are identical or different, represent counterions,
alpha-ethylenically-unsaturated, preferably mono-alpha-ethylenically-unsaturated, monomers comprising a phosphate or phosphonate group,
alpha-ethylenically-unsaturated, preferably mono-alpha-ethylenically-unsaturated, monocarboxylic acids, such as acrylic acid, methacrylic acid
monoalkylesters of alpha-ethylenically-unsaturated, preferably mono-alpha-ethylenically-unsaturated, dicarboxylic acids,
monoalkylamides of alpha-ethylenically-unsaturated, preferably mono-alpha-ethylenically-unsaturated, dicarboxylic acids,
alpha-ethylenically-unsaturated, preferably mono-alpha-ethylenically-unsaturated, compounds comprising a sulphonic acid group, and salts of alpha-ethylenically-unsaturated, preferably mono-alpha-ethylenically-unsaturated, compounds comprising a sulphonic acid group, such as vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS).

While block B is usually a neutral block, block A might be discriminated as regard to its electrical behavior or nature. It means that block A may be a neutral block, or a polyionic block (a polyanionic block, or a polycationic block). It is further mentioned the electrical behavior or nature (neutral, polyanionic or polycationic) may depend on the pH of the emulsion. By polyionic it is meant that the block comprises ionic (anionic or cationic) repetitive units whatever the pH, or that the block comprises repetitive units that may be neutral or ionic (anionic or cationic) depending on the pH of the emulsion (the units are potentially ionic). A unit that may be neutral or ionic (anionic or cationic), depending on the pH of the composition, will be thereafter referred as an ionic unit (anionic or cationic), or as a unit deriving from an ionic monomer (anionic or cationic), whatever it is in a neutral form or in an ionic form (anionic or cationic).

Examples of polycationic blocks are blocks comprising units deriving from cationic monomers such as:
aminoalkyl (meth)acrylates, aminoalkyl (meth)acrylamides, monomers, including particularly (meth)acrylates, and (meth)acrylamides derivatives, comprising at least one secondary, tertiary or quaternary amine function, or a heterocyclic group containing a nitrogen atom, vinylamine or ethylenimine;
diallyldialkyl ammonium salts;
their mixtures, their salts, and macromonomers deriving from therefrom.

Examples of cationic monomers include:
dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
ethylenimine, vinylamine, 2-vinylpyridine, 4-vinylpyridine;
trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride,
diallyidimethyl ammonium chloride,
monomers having the following formula:

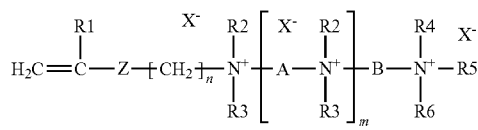

wherein
$R_1$ is a hydrogen atom or a methyl or ethyl group;
$R_2$, $R_3$, $R_4$, $R_5$ and $R_6$, which are identical or different, are linear or branched $C_1$-$C_6$, preferably $C_1$-$C_4$, alkyl, hydroxyalkyl or aminoalkyl groups;

m is an integer from 1 to 10, for example 1;
n is an integer from 1 to 6, preferably 2 to 4;
Z represents a —C(O)O— or —C(O)NH— group or an oxygen atom;
A represents a $(CH_2)_p$ group, p being an integer from 1 to 6, preferably from 2 to 4;
B represents a linear or branched $C_2$-$C_{12}$, advantageously $C_3$-$C_6$, polymethylene chain optionally interrupted by one or more heteroatoms or heterogroups, in particular O or NH, and optionally substituted by one or more hydroxyl or amino groups, preferably hydroxyl groups;
X, which are identical or different, represent counterions, and their mixtures, and macromonomers deriving therefrom.

Examples of anionic blocks are blocks comprising units deriving from anionic monomers selected from the group consisting of:
alpha-ethylenically-unsaturated monomers comprising a phosphate or phosphonate group,
alpha-ethylenically-unsaturated monocarboxylic acids,
monoalkylesters of alpha-ethylenically-unsaturated dicarboxylic acids,
monoalkylamides of alpha-ethylenically-unsaturated dicarboxylic acids,
alpha-ethylenically-unsaturated compounds comprising a sulphonic acid group, and salts of alpha-ethylenically-unsaturated compounds comprising a sulphonic acid group.

Preferred anionic blocks include blocks comprising deriving from at least one anionic monomer selected from the group consisting of:
acrylic acid, methacrylic acid,
vinyl sulphonic acid, salts of vinyl sulfonic acid,
vinylbenzene sulphonic acid, salts of vinylbenzene sulphonic acid,
alpha-acrylamidomethylpropanesulphonic acid, salts of alpha-acrylamidomethylpropanesulphonic acid
2-sulphoethyl methacrylate, salts of 2-sulphoethyl methacrylate,
acrylamido-2-methylpropanesulphonic acid (AMPS), salts of acrylamido-2-methylpropanesulphonic acid, and
styrenesulfonate (SS).

Examples of neutral blocks (block A or block B) are blocks comprising units deriving from at least one monomer selected from the group consisting of:
alkyl oxides, such as ethylene oxide, and propylene oxide,
acrylamide, methacrylamide,
amides of alpha-ethylenically-unsaturated, preferably mono-alpha-ethylenically-unsaturated, monocarboxylic acids,
esters of an alpha-ethylenically-unsaturated, preferably mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, or hydroxyalkyl esters such as 2-hydroxyethylacrylate,
polyethylene and/or polyporpylene oxide (meth)acrylates (i.e. polyethoxylated and/or polypropoxylated (meth)acrylic acid),
vinyl alcohol,
vinyl pyrrolidone,
vinyl acetate, vinyl Versatate,
vinyl nitriles, preferably comprising from 3 to 12 carbon atoms,
acrylonitrile,
vinylamine,
vinylamine amides,
vinyl aromatic compounds, such as styrene, and
mixtures thereof.

Block A or Block B derives from mono-alpha-ethylenically unsaturated monomers. In a preferred embodiment, both block A and block B derive from mono-alpha-ethylenically unsaturated monomers. More precisely, it is meant that for block A and/or block B, at least 50% of the repeating units are mono-alpha-ethylenically-unsaturated monomers derived units.

The monomers listed above, except alkyl oxides such as ethylene oxide and propylene oxide, are mono-alpha-unsaturated monomers.

In a preferred embodiment, the block copolymer is a di-block copolymer. In a preferred embodiment, block A is a poly(acrylic acid) block, or a salt thereof. In a preferred embodiment, block A is a poly(acrylic acid) block and block B is a poly(butylacrylate), or a poly(isooctylacrylate) block, and the block copolymer is more preferably a di-block copolymer (p(BA)-p(AA) di-block copolymer) The poly(acrylic acid) block may be polyanionic or neutral.

There are several methods for making block copolymers. Some methods for making such copolymers are provided below.

It is possible for example to use anionic polymerization with sequential addition of 2 monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a block polymer at each of the ends of another block polymer as described for example by Katayose and Kataoka, Proc. Intern. Symp. Control. Rel. Bioact. Materials, 1996, 23, 899.

In the context of the present invention, it is recommended to use living or controlled polymerization as defined by Quirk and Lee (Polymer International 27, 359 (1992)). Indeed, this particular method makes it possible to prepare polymers with a narrow dispersity and in which the length and the composition of the blocks are controlled by the stoichiometry and the degree of conversion. In the context of this type of polymerization, there are more particularly recommended the copolymers which can be obtained by any so-called living or controlled polymerization method such as, for example:

free-radical polymerization controlled by xanthates according to the teaching of Application WO 98/58974 and U.S. Pat. No. 6,153,705,
free-radical polymerization controlled by dithioesters according to the teaching of Application WO 98/01478,
free-radical polymerization controlled by dithioesters according to the teaching of Application WO 99/35178,
free-radical polymerization controlled by dithiocarbamates according to the teaching of Application WO 99/35177,
free-polymerization using nitroxide precursors according to the teaching of Application WO 99/03894,
free-radical polymerization controlled by dithiocarbamates according to the teaching of Application WO 99/31144,
free-radical polymerization controlled by dithiocarbazates according to the teaching of Application WO 02/26836,
free-radical polymerization controlled by halogenated Xanthates according to the teaching of Application WO 00175207 and U.S. application Ser. No. 09/980,387,
free-radical polymerization controlled by dithiophosphoroesters according to the teaching of Application WO 02/10223,
free-radical polymerization controlled by a transfer agent in the presence of a disulphur compound according to the teaching of Application WO 02/22688, atom transfer radical polymerization (ATRP) according to the teaching of Application WO 96/30421, free-radical polymerization controlled by iniferters according to the teaching of Otu et al., Makromol. Chem. Rapid. Commun., 3, 127 (1982), free-radical polymerization controlled by degenerative transfer of iodine according to the teaching of Tatemoto et al., Jap. 50, 127, 991 (1975), Daikin Kogyo Co Ltd Japan, and Matyjaszewski et al., Macromolecules, 28, 2093 (1995), group transfer polymerization according to the teaching of Webster O. W., "Group Transfer Polymerization", p. 580-588, in the "Encyclopedia of Polymer Science and Engineering", Vol. 7, edited by H. F. Mark, N. M. Bikales, C. G. Overberger and G. Menges, Wiley Interscience, New York, 1987, radical polymerization controlled by tetraphenylethane derivatives (D. Braun et al., Macromol. Symp., 111, 63 (1996)), radical polymerization controlled by organocobalt complexes (Wayland et al., J. Am. Chem. Soc., 116, 7973 (1994)).

Preferred processes are sequenced living free-radical polymerization processes, involving the use of a transfer agent. Preferred transfer agents are agents comprising a group of formula —S—C(S)—Y—, —S—C(S)—S—, or —S—P(S)—Y—, or —S—P(S)—S—, wherein Y is an atom different from sulfur, such as an oxygen atom, a nitrogen atom, and a carbon atom. They include dithioester groups, thioether-thione groups, dithiocarbamate groups, dithiophosphoroesters, dithiocarbazates, and xanthate groups. Examples of groups comprised in preferred transfer agents include groups of formula —S—C(S)—NR—NR'$_{12}$, —S—C(S)—NR—N=CR'$_{12}$, —S—C(S)—O—R, —S—C(S)—CR=CR'$_{12}$, and —S—C(S)—X, wherein R and R' are or identical or different hydrogen atoms, or organic groups such as hydrocarbyl groups, optionally substituted, optionally comprising heteroatoms, and X is an halogen atom. A preferred polymerization process is a living radical polymerization using xanthates.

Copolymers obtained by a living or controlled free-radical polymerization process may comprise at least one transfer agent group at an end of the polymer chain. In particular embodiment such a group is removed or deactivated.

A "living" or "controlled" radical polymerization process used to make the block copolymers comprises the steps of:
a) reacting a mono-alpha-ethylenically-unsaturated monomer, at least a free radicals source compound, and a transfer agent, to obtain a first block, the transfer agent being bounded to said first block,
b1) reacting the first block, another mono-alpha-ethylenically-unsaturated monomer, and, optionally, at least a radical source compound, to obtain a di-block copolymer,
b2) optionally, repeating n times (n being equal to or greater than 0) step b1) to obtain a (n-2)-block copolymer, and then
c) optionally, reacting the transfer agent with means to render it inactive.

For example, a "living" or "controlled" radical polymerization process used to make the di-block copolymers comprises the steps of:
a) reacting a mono-alpha-ethylenically-unsaturated monomer, at least a free radicals source compound, and a transfer agent, to obtain a first block, the transfer agent being bounded to said first block,
b) reacting the first block, another mono-alpha-ethylenically-unsaturated monomer, and, optionally, at least a radical source compound, to obtain a di-block copolymer, and then
c) optionally, reacting the transfer agent with means to render it inactive.

During step a), a first block of the polymer is synthesized. During step b), b1), or b2), another block of the polymer is synthesized.

Examples of transfer agents are transfer agents of the following formula (I):

wherein:
R represents an $R^2O$—, $R^2R^{12}N$— or $R^3$-group, $R^2$ and $R^{12}$, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, $R^3$ representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain, $R^1$ represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and The $R^1$, $R^2$, $R^{12}$ and $R^3$ groups can be substituted by substituted phenyl or alkyl groups, substituted aromatic groups or the following groups: oxo, alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR$_2$), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

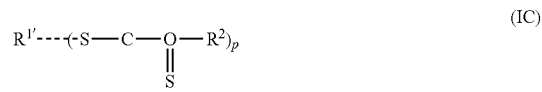

wherein:
$R^2$ and $R^{2'}$ represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, $R^1$ and $R^{2'}$ represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and p is between 2 and 10.

Other examples of transfer agents are transfer agents of the following formulae (II) and (III):

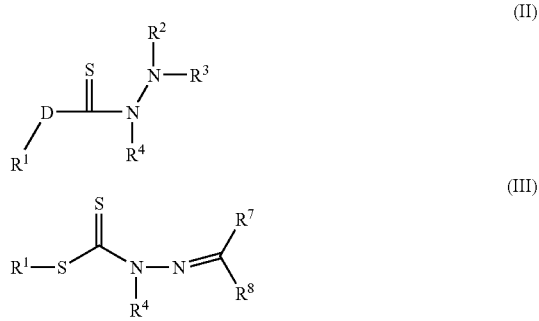

wherein $R^1$ is an organic group, for example a group $R^1$ as defined above for tranfer agents of formulae (I), (IA), (IB), and (IC), $R^2$, $R^3$, $R^4$, $R^7$, and $R^8$ which are identical or different are hydrogen atoms or organic groups, optionally forming rings. Examples of $R^2$, $R^3$, $R^4$, $R^7$, and $R^8$ organic groups include hydrocarbyls, subsituted hydrocabyls, heteroatom-containing hydrocarbyls, and substututed heteroatom-containing hydrocarbyls.

The mono-alpha-ethylenically-unsaturated monomers and their proportions are chosen in order to obtain the desire properties for the block(s). According to this process, if all the successive polymerizations are carried out in the same reactor, it is generally preferable for all the monomers used during one stage to have been consumed before the polymerization of the following stage begins, therefore before the new monomers are introduced. However, it may happen that monomers of the preceding stage are still present in the reactor during the polymerization of the following block. In this case, these monomers generally do not represent more than 5 mol % of all the monomers.

The polymerization can be carried out in an aqueous and/or organic solvent medium. The polymerization can also be carried out in a substantially neat melted form (bulk polymerization), or according to a latex type process in an aqueous medium.

The weight-average molecular weight of the block copolymer is preferably comprised between 1000 and 100000 g/mol. It is more preferably comprised between 2000 and 20000 g/mol. Within these ranges, the weight ratio of each block may vary. It is however preferred that each block has a molecular weight above 500 g/mol, and preferably above 1000 g/mol. Within these ranges, the weight ratio between block A and block B (ratio block B/block A) is preferably of from 40/60 to 95/5, and more preferably of from 50/50 to 95/5.

If an emulsifier different from the block copolymer is used, the weight ratio between the amount of the block copolymer and the amount of the emulsifier together with the block copolymer may vary. This is usually a matter of cost, performance and environment impact. Thus, for emulsions comprising an emulsifier different from the block copolymer, the weight ratio between the amount of the block copolymer and the amount of the emulsifier together with the block copolymer is typically of from 1% to 50%, being preferably of 5% to 50%, for example of from about 10%.

The amount of aqueous phase is usually of from 10 to 99 weight %, relative to the weight of the hydrophobic phase, block copolymer, optional emulsifier, and aqueous phase. It is preferably of from 50 to 95 weight %.

The amount of block copolymer and optional emulsifier is usually of from 0.1 to 10 weight % of the amount of aqueous phase. It is preferably of from 0.5 to 5 weight %.

The emulsion may be prepared by any process known by the one skilled in the art. Usually a process for preparing the emulsion comprises the steps of introducing in a recipient the compounds the emulsion comprises (water, hydrophobic phase compound, block copolymer and optional further emulsifier), and mixing with adding energy in the system (vigorous mixing), for example with a homogenizer. In an embodiment the block copolymer is added to the hydrophobic phase prior to mixing with adding energy. The block copolymer may be introduced in several forms: solid, solution, premix with another compound . . . . In another embodiment the block copolymer is added into an emulsion which has already been prepared.

The stabilized water-in-oil simple emulsions according to the invention may be used in different fields. Examples of simple water-in-oil emulsions include:

explosive emulsions, water-in-oil emulsions drilling fluids in oilfield, also referred to as drilling mud.

water-in-oil emulsions fracturing fluids in oilfield, for example as disclosed in U.S. Pat. No. 5,633,220.

water-in-oil emulsions of green diesel formulations, and water-in oil emulsions polymerization, and polymerization products obtained thereby, for example water-in-oil polymerization of 2-acrylamido-2-methylpropane sulfonic acid (AMPS). Water-in oil emulsions polymerization also include polymerization of acrylamide-based polymers or copolymers for example poly(acrylamide-cationic monomers) copolymers. In water-in-oil polymerization of acrylamide-based polymers or copolymers, block copolymers wherein block A is a polycationic block are preferred.

water-in-oil emulsions used in cosmetics such as creams and milks, for example sunscreens.

EXAMPLES

Ingredients:

Block copolymer BC1: a di-block copolymer polybutylacrylate-polyacrylic acid (pBA-pAA), the weight-average molecular weight of the polybutylacrylate block being 6000 g/mol, and the weight-average molecular weight of the polyacrylic acid block being 1000 g/mol. Weight ratio block B/block A of 60/10.

Block copolymer BC2 is a di-block copolymer polybutylacrylate-polyacrylic acid (pBA-pAA), the weight-average molecular weight of the polybutylacrylate block being 8000 g/mol, and the weight-average molecular weight of the polyacrylic acid block being 2000 g/mol. Weight ratio block B/block A of 80/20.

Emulsifier: Alkamuls OR10 marketed by Rhodia: ethoxylated castor oil of low HLB.

Hydrophobic phase: Phytorob 926-65, a product marketed by Novance: a methyl ester of rape seed oil.

Aqueous phase: 0.1M NaCl solution in deionized water.

Comparative polymer: Arlacel P135, is a tri-block copolymer marketed by Uniqema, comprising a central polyethylene oxide block and 2 hydrophobic polyhydroxystearic acid side blocks.

Emulsification Procedure:

A solution comprising the block copolymer, or the comparative polymer, and optionally the emulsifier, is prepared by dissolving the required amounts in the hydrophobic phase. The aqueous phase is added to the preceding solution so that a ratio aqueous phase/hydrophobic phase ratio of 20/80 (except in example 4: 80/20) is obtained. The sample is then mixed with an ultra-turrax apparatus during 2 min at 10000 rpm.

Tests

Stability is evaluated by following the coalescence as a function of time: coalescence level is expressed as the ratio of:
the water amount appearing as a separate phase at the bottom of the sample, and
the total amount of water initially introduced into the sample.

Example 1

Amount of BC1: 0.5 wt % relative to the aqueous phase.
Amount of emulsifier: 0 wt %

A fluid inverse emulsion is obtained, with droplet sizes ranging between 0.5 and 5 µm. This emulsions has a long-time stability: no water appears at the bottom of the sample after one month.

Example 2

Amounts and coalescence levels are detailed in Table 1.

TABLE 1

| Sample | Surfactant* (wt %) | Block copolymer BC2* (wt %) | Coalescence level at 20° C. after | | |
|---|---|---|---|---|---|
| | | | 1 day | 1 week | 1 month |
| 2.1 (comparative) | 5% | 0 | 80% | 100% | 100% |
| 2.2 | 4.5% | 0.5% | 0 | 0 | <5% |

*concentration relatively to the aqueous phase

In both cases, a fluid inverse emulsion is obtained, with droplet sizes ranging between 1 and 2 µm. Only the addition of block copolymer BC2 provides a long-term stability versus coalescence.

Example 3

Amount of surfactant: 2 wt %.
Amounts of block copolymer or comparative polymer are provided in table 2.

TABLE 2

| Sample | Emulsifier | Droplet size | Coalescence level after 4 days at 80° C. |
|---|---|---|---|
| 3.1 | Block copolymer BC2 | 1-2 µm | 0 |
| 3.2 (comparative) | ArlacelP135 | 1-2 µm | 50% |

Droplet sizes and coalescence levels at elevated temperature are detailed in Table 2. In both cases, a fluid inverse emulsion is obtained. Only the addition of block copolymer BC2 provides a stability in temperature.

Example 4

Amount of BC2: 1 wt % relative to the aqueous phase.
Amount of emulsifier: 0 wt %

Contrarily to all the other examples, the aqueous phase/ hydrophobic phase ratio is 80/20. The aqueous phase is slowly and dropwise added to the hydrophobic phase containing the required amount of BC2.

A very viscous concentrated water-in-oil emulsion is obtained, with droplet sizes ranging between 2 and 10 µm. This emulsions has a long-time stability: no water appears at the bottom of the sample after one month.

The invention claimed is:

1. A method for stabilizing a simple water-in-oil emulsion comprising droplets of an aqueous phase dispersed in a hydrophobic phase,
said method comprising the step of forming an emulsion comprising:
a block copolymer comprising:
(block A)-(block B) linear di-block copolymers,
(block A)-(block B)-(block A) linear tri-block copolymers, or
(block B)-(block A)-(block B) linear tri-block copolymers, and
a surfactant that is different from the block copolymer;
wherein:
block A is a hydrophilic block, and comprises:
vinyl alcohol;
vinyl pyrrolidone;
acrylamide;
methacrylamide;
hydroxyalkylesters of alpha-ethylenically-unsaturated monocarboxylic acids;
hydroxyalkylamides of alpha-ethylenically-unsaturated monocarboxylic acids;
ethylenimine;
vinylamine;
trimethylammonium ethyl acrylate chloride;
trimethylammonium ethyl acrylate methyl sulfate;
dimethylammonium ethyl (meth)acrylate benzyl chloride;
4-benzoyibenzyl dimethylammonium ethyl acrylate chloride;
trimethyl ammonium ethyl (meth)acrylamido (also called 2-(acryloxy)ethyltrimethylammonium, TMAEAMS) chloride;
trimethyl ammonium propyl (meth)acrylamido chloride;
vinylbenzyl trimethyl ammonium chloride;
diallyldimethyl ammonium chloride;
alpha-ethylenically-unsaturated monomers comprising a phosphate or phosphonate group;
monoalkylesters of alpha-ethylenically-unsaturated dicarboxylic acids;
monoalkylamides of alpha-ethylenically-unsaturated dicarboxylic acids;
alpha-ethylenically-unsaturated compounds comprising a sulfonic acid group;
salts of alpha-ethylenically-unsaturated compounds comprising a sulfonic acid group;
2-hydroxyethylacrylate;
vinyl sulfonic acid;
salts of vinyl sulfonic acid;
vinylbenzene sulfonic acid;

salts of vinylbenzene sulfonic acid;
alpha-acrylamidomethylpropanesulfonic acid;
salts of alpha-acrylamidomethylpropanesulfonic acid
2-sulfoethyl methacrylate;
salts of 2-sulfoethyl methacrylate;
acrylamido-2-methylpropanesulfonic acid (AMPS);
salts of acrylamido-2-methylpropanesulfonic acid;
styrenesulfonate (SS);
monomers having the formula:

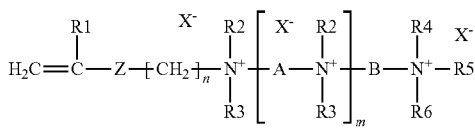

wherein
  $R_1$ is a hydrogen atom or a methyl or ethyl group;
  $R_2, R_3, R_4, R_5$ and $R_6$, which are identical or different, are linear or branched $C_1$-$C_6$ alkyl, hydroxyalkyl or aminoalkyl groups;
  m is an integer from 1 to 10;
  n is an integer from 1 to 6;
  Z represents a —C(O)O— or —C(O)NH— group or an oxygen atom;
  A represents a $(CH_2)_p$ group, p being an integer from 1 to 6;
  B represents a linear or branched $C_2$-$C_{12}$ polymethylene chain optionally interrupted by one or more heteroatoms or heterogroups, optionally substituted by one or more hydroxyl or amino groups; and
  X, which are identical or different, represent counterions;
or,
combinations thereof;
block B is a hydrophobic block, and comprises:
  dialkylsiloxane,
  vinyl versatate,
  vinyl acetate,
  vinyl nitriles, comprising from 3 to 12 carbon atoms,
  vinylamine amides,
  methylacrylate,
  2-ethyl-hexyl acrylate,
  2-ethyl-hexyl methacrylate, or
  combinations thereof; and
further wherein:
block A and/or block B comprises units deriving from mono-alpha-ethylenically-unsaturated monomers.
2. The method of claim 1, wherein block A comprises:
vinyl alcohol;
vinyl pyrrolidone;
methacrylamide;
hydroxyalkylesters of alpha-ethylenically-unsaturated monocarboxylic acids;
hydroxyalkylamides of alpha-ethylenically-unsaturated monocarboxylic acids;
ethylenimine;
vinylamine;
trimethylammonium ethyl acrylate chloride;
trimethylammonium ethyl acrylate methyl sulfate;
dimethylammonium ethyl (meth)acrylate benzyl chloride;
4-benzoylbenzyl dimethylammonium ethyl acrylate chloride;
trimethyl ammonium ethyl (meth)acrylamido (also called 2-(acryloxy)ethyltrimethylammonium, TMAEAMS) chloride;
trimethyl ammonium propyl (meth)acrylamido chloride;
vinylbenzyl trimethyl ammonium chloride;
diallyldimethyl ammonium chloride;
alpha-ethylenically-unsaturated monomers comprising a phosphate or phosphonate group;
monoalkylesters of alpha-ethylenically-unsaturated dicarboxylic acids;
monoalkylamides of alpha-ethylenically-unsaturated dicarboxylic acids;
alpha-ethylenically-unsaturated compounds comprising a sulfonic acid group;
salts of alpha-ethylenically-unsaturated compounds comprising a sulfonic acid group;
2-hydroxyethylacrylate;
vinyl sulfonic acid;
salts of vinyl sulfonic acid;
vinylbenzene sulfonic acid;
salts of vinylbenzene sulfonic acid;
alpha-acrylamidomethylpropanesulfonic acid;
salts of alpha-acrylamidomethylpropanesulfonic acid 2-sulfoethyl methacrylate;
salts of 2-sulfoethyl methacrylate;
acrylamido-2-methylpropanesulfonic acid (AMPS);
salts of acrylamido-2-methylpropanesulfonic acid;
styrenesulfonate (SS);
monomers having the formula:

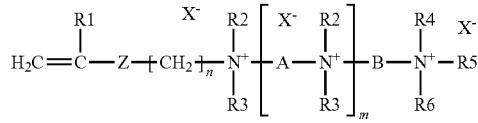

wherein
  $R_1$ is a hydrogen atom or a methyl or ethyl group;
  $R_2, R_3, R_4, R_5$ and $R_6$, which are identical or different, are linear or branched $C_1$-$C_6$ alkyl, hydroxyalkyl or aminoalkyl groups;
  m is an integer from 1 to 10;
  n is an integer from 1 to 6;
  Z represents a —C(O)O— or —C(O)NH— group or an oxygen atom;
  A represents a $(CH_2)_p$ group, p being an integer from 1 to 6;
  B represents a linear or branched $C_2$-$C_{12}$ polymethylene chain optionally interrupted by one or more heteroatoms or heterogroups, optionally substituted by one or more hydroxyl or amino groups; and
  X, which are identical or different, represent counterions;
or,
combinations thereof.
3. The method of claim 1, wherein the amount of aqueous phase ranges from 10 to 99 weight %, relative to the weight of the hydrophobic phase, block copolymer, surfactant, and aqueous phase.
4. The method of claim 3, wherein the amount of aqueous phase ranges from 50 to 95 weight %.
5. The method of claim 1, wherein the amount of block copolymer and surfactant ranges from 0.1 to 10 weight % of the amount of aqueous phase.

6. The method of claim 5, wherein the amount of block copolymer and surfactant ranges from 0.5 to 5 weight %.

7. The method of claim 1, wherein the weight ratio between block B and block A of the block copolymer ranges from 40/60 to 95/5.

8. The method of claim 1, wherein the mixture of the block copolymer and the surfactant has an HLB of lower than or equal to 10.

9. The method of claim 1, wherein the emulsion is an explosive emulsion and wherein the hydrophilic phase comprises an oxygen-donating compound.

10. The method of claim 1, wherein the surfactant comprises a polyisobutene succinic anhydride, optionally modified, and wherein the aqueous phase comprises ammonium nitrate.

11. The method of claim 1, wherein the hydrophobic phase comprises an organic, vegetal or mineral oil, or a wax.

12. A simple water-in-oil emulsion comprising:
droplets of an aqueous phase dispersed in a hydrophobic phase,
a block copolymer comprising:
(block A)-(block B) linear di-block copolymers,
(block A)-(block B)-(block A) linear tri-block copolymers, or
(block B)-(block A)-(block B) linear tri-block copolymers, and
a surfactant that is different from the block copolymer;
wherein:
block A is a hydrophilic block, and comprises:
vinyl alcohol;
vinyl pyrrolidone;
acrylamide;
methacrylamide;
hydroxyalkylesters of alpha-ethylenically-unsaturated monocarboxylic acids;
hydroxyalkylamides of alpha-ethylenically-unsaturated monocarboxylic acids;
ethylenimine;
vinylamine;
trimethylammonium ethyl acrylate chloride;
trimethylammonium ethyl acrylate methyl sulfate;
dimethylammonium ethyl (meth)acrylate benzyl chloride;
4-benzoylbenzyl dimethylammonium ethyl acrylate chloride;
trimethyl ammonium ethyl (meth)acrylamido (also called 2-(acryloxy)ethyltrimethylammonium, TMAEAMS) chloride;
trimethyl ammonium propyl (meth)acrylamido chloride;
vinylbenzyl trimethyl ammonium chloride;
diallyldimethyl ammonium chloride;
alpha-ethylenically-unsaturated monomers comprising a phosphate or phosphonate group;
monoalkylesters of alpha-ethylenically-unsaturated dicarboxylic acids;
monoalkylamides of alpha-ethylenically-unsaturated dicarboxylic acids;
alpha-ethylenically-unsaturated compounds comprising a sulfonic acid group;
salts of alpha-ethylenically-unsaturated compounds comprising a sulfonic acid group;
2-hydroxyethylacrylate;
vinyl sulfonic acid;
salts of vinyl sulfonic acid;
vinylbenzene sulfonic acid;
salts of vinylbenzene sulfonic acid;
alpha-acrylamidomethylpropanesulfonic acid;
salts of alpha-acrylamidomethylpropanesulfonic acid 2-sulfoethyl methacrylate;
salts of 2-sulfoethyl methacrylate;
acrylamido-2-methylpropanesulfonic acid (AMPS);
salts of acrylamido-2-methylpropanesulfonic acid;
styrenesulfonate (SS);
monomers having the formula:

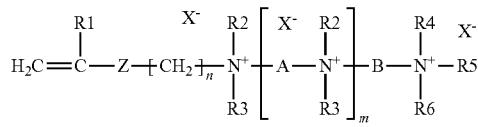

wherein
$R_1$ is a hydrogen atom or a methyl or ethyl group;
$R_2, R_3, R_4, R_5$ and $R_6$, which are identical or different, are linear or branched $C_1$-$C_6$ alkyl, hydroxyalkyl or aminoalkyl groups;
m is an integer from 1 to 10;
n is an integer from 1 to 6;
Z represents a —C(O)O— or —C(O)NH— group or an oxygen atom;
A represents a $(CH_2)_p$ group, p being an integer from 1 to 6;
B represents a linear or branched $C_2$-$C_{12}$ polymethylene chain optionally interrupted by one or more heteroatoms or heterogroups, optionally substituted by one or more hydroxyl or amino groups; and
X, which are identical or different, represent counterions;
or,
combinations thereof;
block B is a hydrophobic block, and comprises:
dialkylsiloxane,
vinyl versatate,
vinyl acetate,
vinyl nitriles, comprising from 3 to 12 carbon atoms,
vinylamine amides,
methylacrylate,
2-ethyl-hexyl acrylate,
2-ethyl-hexyl methacrylate, or
combinations thereof; and
further wherein:
block A and/or block B comprises units deriving from mono-alpha-ethylenically-unsaturated monomers.

13. The emulsion of claim 12, wherein block A comprises:
vinyl alcohol;
vinyl pyrrolidone;
methacrylamide;
hydroxyalkylesters of alpha-ethylenically-unsaturated monocarboxylic acids;
hydroxyalkylamides of alpha-ethylenically-unsaturated monocarboxylic acids;
ethylenimine;
vinylamine;
trimethylammonium ethyl acrylate chloride;
trimethylammonium ethyl acrylate methyl sulfate;
dimethylammonium ethyl (meth)acrylate benzyl chloride;
4-benzoylbenzyl dimethylammonium ethyl acrylate chloride;
trimethyl ammonium ethyl (meth)acrylamido (also called 2-(acryloxy)ethyltrimethylammonium, TMAEAMS) chloride;

trimethyl ammonium propyl (meth)acrylamido chloride;
vinylbenzyl trimethyl ammonium chloride;
diallyldimethyl ammonium chloride;
alpha-ethylenically-unsaturated monomers comprising a phosphate or phosphonate group;
monoalkylesters of alpha-ethylenically-unsaturated dicarboxylic acids;
monoalkylamides of alpha-ethylenically-unsaturated dicarboxylic acids;
alpha-ethylenically-unsaturated compounds comprising a sulfonic acid group;
salts of alpha-ethylenically-unsaturated compounds comprising a sulfonic acid group;
2-hydroxyethylacrylate;
vinyl sulfonic acid;
salts of vinyl sulfonic acid;
vinylbenzene sulfonic acid;
salts of vinylbenzene sulfonic acid;
alpha-acrylamidomethylpropanesulfonic acid;
salts of alpha-acrylamidomethylpropanesulfonic acid 2-sulfoethyl methacrylate;
salts of 2-sulfoethyl methacrylate;
acrylamido-2-methylpropanesulfonic acid (AMPS);
salts of acrylamido-2-methylpropanesulfonic acid;
styrenesulfonate (SS);
monomers having the formula:

$$H_2C=\overset{R_1}{\underset{}{C}}-Z-(CH_2)_n-\overset{R_2}{\underset{R_3}{N^+}}X^- \left[-A-\overset{R_2}{\underset{R_3}{N^+}}X^-\right]_m -B-\overset{R_4}{\underset{R_6}{N^+}}-R_5\ X^-$$

wherein
  $R_1$ is a hydrogen atom or a methyl or ethyl group;
  $R_2, R_3, R_4, R_5$ and $R_6$, which are identical or different, are linear or branched $C_1$-$C_6$ alkyl, hydroxyalkyl or aminoalkyl groups;
  m is an integer from 1 to 10;
  n is an integer from 1 to 6;
  Z represents a —C(O)O— or —C(O)NH— group or an oxygen atom;
  A represents a $(CH_2)_p$ group, p being an integer from 1 to 6;
  B represents a linear or branched $C_2$-$C_{12}$ polymethylene chain optionally interrupted by one or more heteroatoms or heterogroups, optionally substituted by one or more hydroxyl or amino groups; and
  X, which are identical or different, represent counterions;
or,
combinations thereof.

14. The emulsion of claim 12, wherein the amount of aqueous phase ranges from 10 to 99 weight %, relative to the weight of the hydrophobic phase, block copolymer, surfactant, and aqueous phase.

15. The emulsion of claim 12, wherein the amount of aqueous phase ranges from 50 to 95 weight %.

16. The emulsion of claim 12, wherein the amount of block copolymer and surfactant ranges from 0.1 to 10 weight % of the amount of the aqueous phase.

17. The emulsion of claim 16, wherein the amount of block copolymer and surfactant ranges from 0.5 to 5 weight %.

18. The emulsion of claim 12, wherein the weight ratio of block B to block A of the block copolymer ranges from 40/60 to 95/5.

19. The emulsion of claim 12, wherein the mixture of the block copolymer and the surfactant has an HLB of lower than or equal to 10.

20. The emulsion of claim 12, wherein the emulsion is an explosive emulsion, and wherein the aqueous phase comprises an oxygen-donating compound.

21. The emulsion of claim 12, wherein the surfactant is a polyisobutene succinic anhydride, optionally modified, and wherein the aqueous phase comprises ammonium nitrate.

22. The emulsion of claim 12, wherein the hydrophobic phase comprises an organic, vegetal, or mineral oil, or a wax.

23. The emulsion of claim 1, wherein said block copolymer is a (block A)-(block B) linear di-block copolymer.

24. The emulsion of claim 12, wherein said block copolymer is a (block A)-(block B) linear di-block copolymer.

25. A method for stabilizing a simple water-in-oil emulsion comprising droplets of an aqueous phase dispersed in a hydrophobic phase,
said method comprising the step of forming an emulsion comprising:
  a block copolymer comprising a (block A)-(block B) linear di-block copolymer, and
  a surfactant that is different from the block copolymer, wherein:
    block A comprises acrylic acid, and
    block B comprises butyl acrylate, and
    further wherein said emulsion is less than 5% coalesced after one month at 20° C.

26. A simple water-in-oil emulsion comprising:
droplets of an aqueous phase dispersed in a hydrophobic phase,
a block copolymer comprising a (block A)-(block B) linear di-block copolymer, and
a surfactant that is different from the block copolymer, wherein:
  block A comprises acrylic acid, and
  block B comprises butyl acrylate, and
  further wherein said emulsion is less than 5% coalesced after one month at 20° C.

27. A method for stabilizing a simple water-in-oil emulsion comprising droplets of an aqueous phase dispersed in a hydrophobic phase,
said method comprising the step of forming an emulsion comprising:
a block copolymer comprising:
  (block A)-(block B) linear di-block copolymers,
  (block A)-(block B)-(block A) linear tri-block copolymers, or
  (block B)-(block A)-(block B) linear tri-block copolymers, and
a surfactant that is different from the block copolymer;
wherein:
block A is a hydrophilic block, and comprises:
  vinyl alcohol;
  vinyl pyrrolidone;
  acrylamide;
  acrylic acid;
  methacrylamide;
  hydroxyalkylesters of alpha-ethylenically-unsaturated monocarboxylic acids;
  hydroxyalkylamides of alpha-ethylenically-unsaturated monocarboxylic acids;
  ethylenimine;
  vinylamine;

trimethylammonium ethyl acrylate chloride;
trimethylammonium ethyl acrylate methyl sulfate;
dimethylammonium ethyl (meth)acrylate benzyl chloride;
4-benzoylbenzyl dimethylammonium ethyl acrylate chloride;
trimethyl ammonium ethyl (meth)acrylamido (also called 2-(acryloxy)ethyltrimethylammonium, TMAEAMS) chloride;
trimethyl ammonium propyl (meth)acrylamido chloride;
vinylbenzyl trimethyl ammonium chloride;
diallyldimethyl ammonium chloride;
alpha-ethylenically-unsaturated monomers comprising a phosphate or phosphonate group;
monoalkylesters of alpha-ethylenically-unsaturated dicarboxylic acids;
monoalkylamides of alpha-ethylenically-unsaturated dicarboxylic acids;
alpha-ethylenically-unsaturated compounds comprising a sulfonic acid group;
salts of alpha-ethylenically-unsaturated compounds comprising a sulfonic acid group;
2-hydroxyethylacrylate;
vinyl sulfonic acid;
salts of vinyl sulfonic acid;
vinylbenzene sulfonic acid;
salts of vinylbenzene sulfonic acid;
alpha-acrylamidomethylpropanesulfonic acid;
salts of alpha-acrylamidomethylpropanesulfonic acid 2-sulfoethyl methacrylate;
salts of 2-sulfoethyl methacrylate;
acrylamido-2-methylpropanesulfonic acid (AMPS);
salts of acrylamido-2-methylpropanesulfonic acid;
styrenesulfonate (SS);
monomers having the formula:

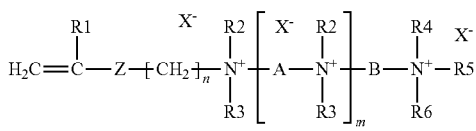

wherein
R₁ is a hydrogen atom or a methyl or ethyl group;
R₂, R₃, R₄, R₅ and R₆, which are identical or different, are linear or branched $C_1$-$C_6$ alkyl, hydroxyalkyl or aminoalkyl groups;
m is an integer from 1 to 10;
n is an integer from 1 to 6;
Z represents a —C(O)O— or —C(O)NH— group or an oxygen atom;
A represents a $(CH_2)_p$ group, p being an integer from 1 to 6;
B represents a linear or branched $C_2$-$C_{12}$ polymethylene chain optionally interrupted by one or more heteroatoms or heterogroups, optionally substituted by one or more hydroxyl or amino groups; and
X, which are identical or different, represent counterions;
or,
combinations thereof;
block B is a hydrophobic block, and comprises:
dialkylsiloxane,
vinyl versatate,
vinyl acetate,
vinyl nitriles, comprising from 3 to 12 carbon atoms,
vinylamine amides,
methylacrylate,
2-ethyl-hexyl acrylate,
butyl acrylate;
2-ethyl-hexyl methacrylate, or
combinations thereof; and
further wherein:
block A and/or block B comprises units deriving from mono-alpha-ethylenically-unsaturated monomers.
28. The method of claim 27, wherein block A comprises:
vinyl alcohol;
vinyl pyrrolidone;
acrylic acid;
methacrylamide;
hydroxyalkylesters of alpha-ethylenically-unsaturated monocarboxylic acids;
hydroxyalkylamides of alpha-ethylenically-unsaturated monocarboxylic acids;
ethylenimine;
vinylamine;
trimethylammonium ethyl acrylate chloride;
trimethylammonium ethyl acrylate methyl sulfate;
dimethylammonium ethyl (meth)acrylate benzyl chloride;
4-benzoylbenzyl dimethylammonium ethyl acrylate chloride;
trimethyl ammonium ethyl (meth)acrylamido (also called 2-(acryloxy)ethyltrimethylammonium, TMAEAMS) chloride;
trimethyl ammonium propyl (meth)acrylamido chloride;
vinylbenzyl trimethyl ammonium chloride;
diallyldimethyl ammonium chloride;
alpha-ethylenically-unsaturated monomers comprising a phosphate or phosphonate group;
monoalkylesters of alpha-ethylenically-unsaturated dicarboxylic acids;
monoalkylamides of alpha-ethylenically-unsaturated dicarboxylic acids;
alpha-ethylenically-unsaturated compounds comprising a sulfonic acid group;
salts of alpha-ethylenically-unsaturated compounds comprising a sulfonic acid group;
2-hydroxyethylacrylate;
vinyl sulfonic acid;
salts of vinyl sulfonic acid;
vinylbenzene sulfonic acid;
salts of vinylbenzene sulfonic acid;
alpha-acrylamidomethylpropanesulfonic acid;
salts of alpha-acrylamidomethylpropanesulfonic acid 2-sulfoethyl methacrylate;
salts of 2-sulfoethyl methacrylate;
acrylamido-2-methylpropanesulfonic acid (AMPS);
salts of acrylamido-2-methylpropanesulfonic acid;
styrenesulfonate (SS);
monomers having the formula:

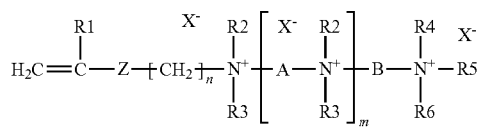

wherein
R₁ is a hydrogen atom or a methyl or ethyl group;
R₂, R₃, R₄, R₅ and R₆, which are identical or different, are linear or branched $C_1$-$C_6$ alkyl, hydroxyalkyl or aminoalkyl groups;
m is an integer from 1 to 10;
n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$ polymethylene chain optionally interrupted by one or more heteroatoms or heterogroups, optionally substituted by one or more hydroxyl or amino groups; and X, which are identical or different, represent counterions;

or, combinations thereof.

29. The method of claim 27, wherein block A comprises acrylic acid.

30. The method of claim 27, wherein block B comprises butylacrylate.

31. The method of claim 27, wherein block A comprises acrylic acid and block B comprises butylacrylate.

32. The method of claim 28, wherein block A comprises acrylic acid.

33. The method of claim 28, wherein block B comprises butylacrylate.

34. The method of claim 28, wherein block A comprises acrylic acid and block B comprises butylacrylate.

35. A simple water-in-oil emulsion comprising:
droplets of an aqueous phase dispersed in a hydrophobic phase,
a block copolymer comprising:
(block A)-(block B) linear di-block copolymers,
(block A)-(block B)-(block A) linear tri-block copolymers, or
(block B)-(block A)-(block B) linear tri-block copolymers, and
a surfactant that is different from the block copolymer;
wherein:
block A is a hydrophilic block, and comprises:
vinyl alcohol;
vinyl pyrrolidone;
acrylic acid;
acrylamide;
methacrylamide;
hydroxyalkylesters of alpha-ethylenically-unsaturated monocarboxylic acids;
hydroxyalkylamides of alpha-ethylenically-unsaturated monocarboxylic acids;
ethylenimine;
vinylamine;
trimethylammonium ethyl acrylate chloride;
trimethylammonium ethyl acrylate methyl sulfate;
dimethylammonium ethyl (meth)acrylate benzyl chloride;
4-benzoylbenzyl dimethylammonium ethyl acrylate chloride;
trimethyl ammonium ethyl (meth)acrylamido (also called 2-(acryloxy)ethyltrimethylammonium, TMAEAMS) chloride;
trimethyl ammonium propyl (meth)acrylamido chloride;
vinylbenzyl trimethyl ammonium chloride;
diallyldimethyl ammonium chloride;
alpha-ethylenically-unsaturated monomers comprising a phosphate or phosphonate group;
monoalkylesters of alpha-ethylenically-unsaturated dicarboxylic acids;
monoalkylamides of alpha-ethylenically-unsaturated dicarboxylic acids;
alpha-ethylenically-unsaturated compounds comprising a sulfonic acid group;
salts of alpha-ethylenically-unsaturated compounds comprising a sulfonic acid group;
2-hydroxyethylacrylate;
vinyl sulfonic acid;
salts of vinyl sulfonic acid;
vinylbenzene sulfonic acid;
salts of vinylbenzene sulfonic acid;
alpha-acrylamidomethylpropanesulfonic acid;
salts of alpha-acrylamidomethylpropanesulfonic acid 2-sulfoethyl methacrylate;
salts of 2-sulfoethyl methacrylate;
acrylamido-2-methylpropanesulfonic acid (AMPS);
salts of acrylamido-2-methylpropanesulfonic acid;
styrenesulfonate (SS);
monomers having the formula:

$$H_2C=\overset{R1}{\underset{}{C}}-Z-[CH_2]_n-\overset{X^-}{\underset{R3}{N^+}}-\left[A-\overset{X^-}{\underset{R3}{N^+}}\right]_m-B-\overset{X^-}{\underset{R6}{N^+}}-R5$$

wherein
$R_1$ is a hydrogen atom or a methyl or ethyl group;
$R_2, R_3, R_4, R_5$ and $R_6$, which are identical or different, are linear or branched $C_1$-$C_6$ alkyl, hydroxyalkyl or aminoalkyl groups;
m is an integer from 1 to 10;
n is an integer from 1 to 6;
Z represents a —C(O)O— or —C(O)NH— group or an oxygen atom;
A represents a $(CH_2)_p$ group, p being an integer from 1 to 6;
B represents a linear or branched $C_2$-$C_{12}$ polymethylene chain optionally interrupted by one or more heteroatoms or heterogroups, optionally substituted by one or more hydroxyl or amino groups; and
X, which are identical or different, represent counterions;
or,
combinations thereof;
block B is a hydrophobic block, and comprises:
dialkylsiloxane,
vinyl versatate,
vinyl acetate,
vinyl nitriles, comprising from 3 to 12 carbon atoms,
vinylamine amides,
methylacrylate,
2-ethyl-hexyl acrylate,
butylacrylate,
2-ethyl-hexyl methacrylate, or
combinations thereof; and
further wherein:
block A and/or block B comprises units deriving from mono-alpha-ethylenically-unsaturated monomers.

36. The emulsion of claim 35, wherein block A comprises:
vinyl alcohol;
vinyl pyrrolidone;
acrylic acid;
methacrylamide;

hydroxyalkylesters of alpha-ethylenically-unsaturated monocarboxylic acids;
hydroxyalkylamides of alpha-ethylenically-unsaturated monocarboxylic acids;
ethylenimine;
vinylamine;
trimethylammonium ethyl acrylate chloride;
trimethylammonium ethyl acrylate methyl sulfate;
dimethylammonium ethyl (meth)acrylate benzyl chloride;
4-benzoylbenzyl dimethylammonium ethyl acrylate chloride;
trimethyl ammonium ethyl (meth)acrylamido (also called 2-(acryloxy)ethyltrimethylammonium, TMAEAMS) chloride;
trimethyl ammonium propyl (meth)acrylamido chloride;
vinylbenzyl trimethyl ammonium chloride;
diallyldimethyl ammonium chloride;
alpha-ethylenically-unsaturated monomers comprising a phosphate or phosphonate group;
monoalkylesters of alpha-ethylenically-unsaturated dicarboxylic acids;
monoalkylamides of alpha-ethylenically-unsaturated dicarboxylic acids;
alpha-ethylenically-unsaturated compounds comprising a sulfonic acid group;
salts of alpha-ethylenically-unsaturated compounds comprising a sulfonic acid group;
2-hydroxyethylacrylate;
vinyl sulfonic acid;
salts of vinyl sulfonic acid;
vinylbenzene sulfonic acid;
salts of vinylbenzene sulfonic acid;
alpha-acrylamidomethylpropanesulfonic acid;
salts of alpha-acrylamidomethylpropanesulfonic acid 2-sulfoethyl methacrylate;
salts of 2-sulfoethyl methacrylate;
acrylamido-2-methylpropanesulfonic acid (AMPS);
salts of acrylamido-2-methylpropanesulfonic acid;
styrenesulfonate (SS);

monomers having the formula:

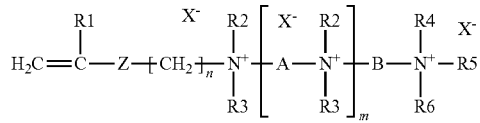

wherein
R$_1$ is a hydrogen atom or a methyl or ethyl group;
R$_2$, R$_3$, R$_4$, R$_5$ and R$_6$, which are identical or different, are linear or branched C$_1$-C$_6$ alkyl, hydroxyalkyl or aminoalkyl groups;
m is an integer from 1 to 10;
n is an integer from 1 to 6;
Z represents a —C(O)O— or —C(O)NH— group or an oxygen atom;
A represents a (CH$_2$)$_p$ group, p being an integer from 1 to 6;
B represents a linear or branched C$_2$-C$_{12}$ polymethylene chain optionally interrupted by one or more heteroatoms or heterogroups, optionally substituted by one or more hydroxyl or amino groups; and
X, which are identical or different, represent counterions;
or,
combinations thereof.

37. The emulsion of claim 35, wherein block A comprises acrylic acid.

38. The emulsion of claim 35, wherein block B comprises butylacrylate.

39. The emulsion of claim 35, wherein block A comprises acrylic acid and block B comprises butylacrylate.

40. The emulsion of claim 36, wherein block A comprises acrylic acid.

41. The emulsion of claim 36, wherein block B comprises butylacrylate.

42. The emulsion of claim 36, wherein block A comprises acrylic acid and block B comprises butylacrylate.

* * * * *

UNITED STATES PATENT AND TRADEMARK OFFICE
CERTIFICATE OF CORRECTION

| | | |
|---|---|---|
| PATENT NO. | : 8,357,724 B2 | Page 1 of 1 |
| APPLICATION NO. | : 11/435041 | |
| DATED | : January 22, 2013 | |
| INVENTOR(S) | : Deroo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this
Second Day of December, 2014

Michelle K. Lee
*Deputy Director of the United States Patent and Trademark Office*